(12) United States Patent
Elvira

(10) Patent No.: US 10,467,030 B2
(45) Date of Patent: Nov. 5, 2019

(54) SINGLE USER DISPLAY INTERFACE

(71) Applicant: SAP SE, Walldorf (DE)

(72) Inventor: David Sierro Elvira, Heidelberg (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 15/603,351

(22) Filed: May 23, 2017

(65) Prior Publication Data

US 2018/0341498 A1    Nov. 29, 2018

(51) Int. Cl.
*G06F 9/451* (2018.01)
*G06Q 10/06* (2012.01)

(52) U.S. Cl.
CPC ............. *G06F 9/451* (2018.02); *G06Q 10/06* (2013.01)

(58) Field of Classification Search
CPC ...................................................... G06F 9/451
USPC ........................................................ 715/745
See application file for complete search history.

(56) References Cited

U.S. PATENT DOCUMENTS

| | | | |
|---|---|---|---|
| 8,498,985 B2 | 7/2013 | Spence et al. | |
| 9,164,776 B2* | 10/2015 | Rauh | G06F 9/4443 |
| 9,256,839 B2 | 2/2016 | Plattner et al. | |
| 9,648,107 B1* | 5/2017 | Penilla | H04L 67/12 |
| 2004/0015476 A1* | 1/2004 | Twaddle | G06F 17/30893 |
| 2004/0230636 A1* | 11/2004 | Masuoka | G06F 9/451 708/800 |
| 2007/0240057 A1 | 10/2007 | Satterfield et al. | |
| 2007/0266136 A1* | 11/2007 | Esfahany | H04L 41/022 709/223 |
| 2012/0109661 A1 | 5/2012 | Lueckhoff | |
| 2012/0173996 A1* | 7/2012 | Bartomeli | G06F 9/451 715/762 |
| 2015/0019547 A1 | 1/2015 | Thalapathy et al. | |
| 2015/0026642 A1* | 1/2015 | Wilson | G06F 3/0482 715/825 |
| 2016/0011730 A1 | 1/2016 | Rajasekar et al. | |
| 2016/0162172 A1* | 6/2016 | Rathod | G06F 3/0481 715/747 |

* cited by examiner

*Primary Examiner* — William D Titcomb
(74) *Attorney, Agent, or Firm* — Mintz Levin Cohn Ferris Glovsky and Popeo, P.C.

(57) ABSTRACT

A request is received from a user of one of the one or more business applications for a business object. A single user interface is generating for displaying the data associated with the requested business object. A link between the requested business object and all of the data associated with the business object stored in the one or more data repositories is created. A subset of all of the data associated with the business object in the single user interface is displayed, the displaying being based on a role associated with the user making the request for the business object, the role being used by the at least one programmable processor for determining the subset of all of the data associated with the business object for displaying in the single user interface.

12 Claims, 4 Drawing Sheets

SINGLE USER DISPLAY INTERFACE

TECHNICAL FIELD

The subject matter described herein relates to a user interface for displaying a business object, and more particularly to a single user interface for displaying a subset of data associated with the business object based on a user's role or profile within an organization.

BACKGROUND

In a business enterprise, particularly within an enterprise's data management system, each department or user needs to access different information associated with the same business object depending on the department's or user's business area, role, etc. For instance, as shown in FIG. 1, a developer might be interested in reviewing information about a user who appears as the last user that modified some code which is causing a problem. When checking the information about the last modifications, the developer is able to access a business object providing only limited information about the user and see information which basically provides the username of the last user "FATHP." As shown in FIG. 2, by double clicking on a part of the user interface shown in FIG. 1, a popup window can be generated in the user interface, but typically provides just a little more information, such as would be common to any requester for that information.

In the example above, a developer would be interested to know a department to which the user belongs or has he belonged, who the user's manager is, or what the user's expertise are in order to evaluate several aspects of the problem. This additional information may, for example, instruct the developer as to whether the error is caused by a human error or whether it might be related to some other parallel development. Currently, it is only possible to collect data connecting to many different systems, such as success maps, to determine the expertise of the user, the address book where the user is based, and so on, but this requires a substantial amount of time and does not always lead to the information the developer is looking for.

Similarly, the same business object might be used for very different topics and therefore, depending on who requires more details about it, the output should provide different data accordingly. For instance, in a bank, having a business object such as a "Business Partner" object related to a customer, a bank employee might be interested in knowing which products from the bank are already used by the customer. However, the Business Partner object for a different customer of the bank might be the same business object but used for a very different purpose such as, for example, verifying contact information (e.g. mobile number) for an authorized account holder of that different customer.

Further, the information provided by business objects and displayed for users of business object processing systems is usually insufficient for the user's purposes. For instance, when looking for user details at change documents—notes, creator, user profile, etc.—the information displayed by the business object is very often just the user identifier (ID) and possibly other few details. The research time invested to know basic details about a user is often exhausting and very time consuming.

SUMMARY

This document presents a system, method and computer program product that provide a single user interface for displaying a subset of data associated with a business object based on a user's role or profile within an organization By creating a single point repository for users, it is possible to access the user information details which provides the most relevant data of the user. A single user display interface for all the applications and solutions enables the system to display all relevant information about the customized business object from any entry point (change documents, notes, transactions, logs, workflows, etc.). The business object of the user is but one example, and can be a different business object such as bank accounts, systems, courses, payments, workflow items, etc. The relevant data to be displayed is customizable and can be grouped into user profiles. The data displayed can further be restricted based on authorization profiles. Accordingly, all relevant data is provided at a glance in a single unified graphical user interface (UI) generated in a display. Business object information is available from any application, technology, or platform. Authorization level provides security and reliability about private or sensitive user details, and resulting in significant time savings when searching for relevant user details. Not only user details, but all the business objects that have been customized. There is a pre-delivered set with the most relevant business objects, but the user can always customize their own business objects by setting it up (configure relevant systems connections, fields technical name, etc.)

In some aspects, a system, method and computer program product execute a process that includes the steps of receiving a request from a user of one of the one or more business applications for the business object, the business object being associated with data that is stored in one or more data repositories; generating the single user interface for displaying the data associated with the requested business object. The steps further include creating a link between the requested business object and all of the data associated with the business object stored in the one or more data repositories. The steps further include displaying a subset of all of the data associated with the business object in the single user interface, the displaying being based on a role associated with the user making the request for the business object, the role being used by the at least one programmable processor for determining the subset of all of the data associated with the business object for displaying in the single user interface.

Implementations of the current subject matter can include, but are not limited to, systems and methods consistent including one or more features are described as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings, FIG. 1 depicts a user interface that displays information about a business object;

Figures 1, 2:
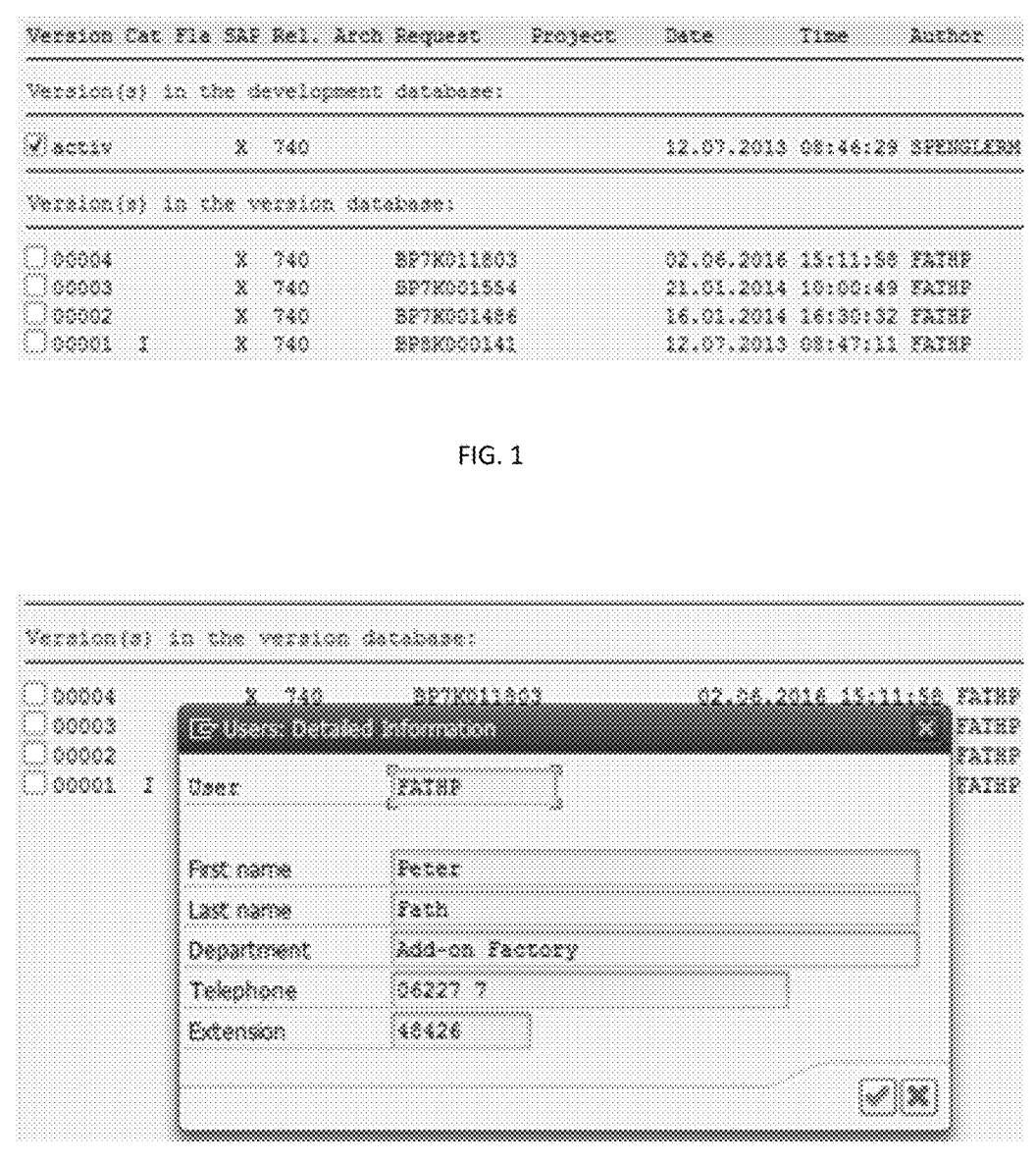

FIG. 2 depicts a window from the user interface, displaying more data about the business object;

When practical, similar reference numbers denote similar structures, features, or elements.

DETAILED DESCRIPTION

This document describes systems, methods and non-transitory computer program products for generating and displaying a single user interface for displaying a subset of data associated with a business object from a business object repository. The data displayed can be based on a user's role or profile within an organization, thereby providing access to information associated with the business object that is the most relevant to a user of one or more systems. Further, the data can be collected from different systems and might be useful for different systems, not only one.

A single user display interface for all the applications and solutions enables the system to display all relevant data about the business object from any entry point (change documents, notes, transactions, logs, workflows, etc.). The relevant data is grouped into user profiles and/or secured or restricted for customizable displays based on the user and is thus provided at a glance in a single UI generated in a display. User information is available from any application or platform, which results in significant time savings when searching for relevant user details.

Figure 3:
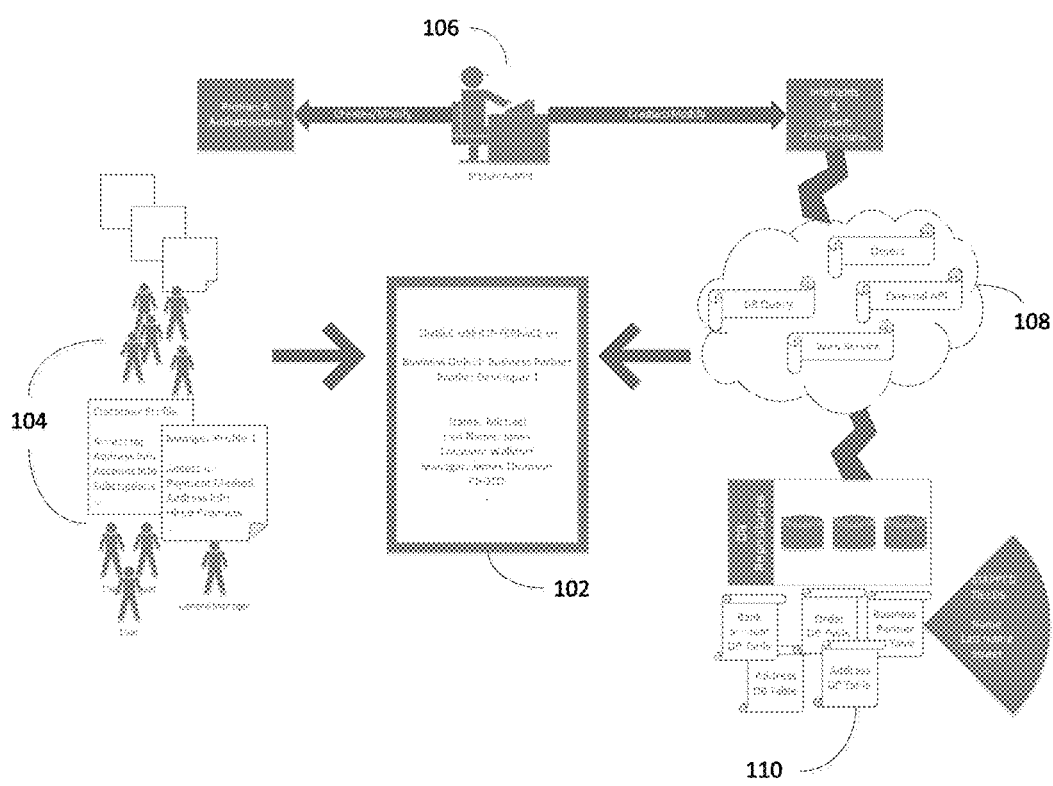
FIG. 3 illustrates a system for generating a single user interface for displaying data associated with a business object that is accessible by one or more business applications.

FIG. 3 is a block diagram of a system 100 for generating a single user interface (SUI) 102. The SUI 102 displays data relevant to each business object, in this case based on one or more profiles and/or roles 104 of the user. For example, a user can be a customer of an enterprise, a manager of the enterprise, or employee. The profile and/or role of the user determines the authorizations applied to each user for accessing data in the SUI 102. The profiles and/or roles, and resulting authorizations thereof, are created and/or modified by a system administrator 106 for the users. The data in the SUI 102 includes a subset of data associated with a business object accessed by the user, and that portion is determined by the authorizations. The SUI 102 display includes data associated with only one business object, specifically the one on which the user has clicked in the UI and technology the user was working with (HTML, JAVA, ABAP, . . . ). On each technology (HTML, JAVA, ABAP, . . . ) it will be recognized (and highlighted) through the coding (e.g. in ABAP, a Business Partner's business object will have a specific data element) all the business objects that have been configured in the SUI 102. The user can then click on any of those business objects and get the SUI 102 display with the portion of information. This portion of information can contain data from different business objects.

The system administrator 106, via an SUI tool, can configure information fields, and automatically create connections 108 or links to any number of database repositories 110 that store the data in the information fields. In some instances, a buffer can be implemented to accelerate information access. For example, the connections or links can include a database query, external application programming interface (API), web services, or the like. Data in the database repositories 110 are mapped to the connections 108 for display in the SUI 102 according to the user's profile and role. Accordingly, only relevant data is displayed for that user in the SUI 102.

Figure 4:
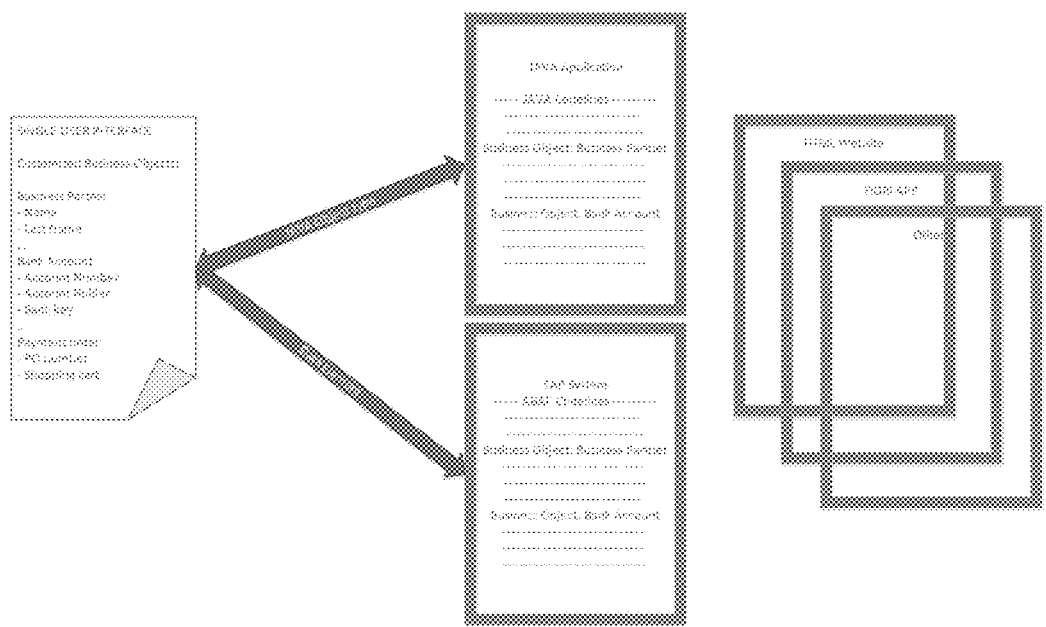
FIG. 4 shows how a single user interface can be mapped or linked to relevant data objects and technologies, such as JAVA and ABAP.

As shown in FIG. 4, the Single User Interface (SUI) identifies certain objects (the ones that have been customized) in the UIs such as, for example Business Partners objects, and automatically creates a link between that business object and all of its data which will be gathered and displayed accordingly in the SUI tool.

The identification of the object depends on the UI on which the user is working. For instance, if the user is working in a SAP system which is coded in ABAP, a Single User Interface (SUI) add-on will identify the object through a data element type. In the case of a business partner, the data element would be "BU_PARTNER". Each technology such as browsers working with HTML, JAVA programs, etc., employs its own techniques and processes to identify the objects for which the SUI is going to be called.

The link between the object and all the data about to be displayed can be created using any one of a number of different methodologies, which are configured at the implementation phase. For instance, in order to gather the data to be displayed, the system might use Web Services, DB queries, RFC connection, hyperlinks, or the like.

The SUI includes, by default, the most relevant business objects already mapped with the sources from which the SUI will retrieve the object details. For instance, the Business Partner objects can be delivered by default. All these pre-delivered objects are available to be selected in a user-friendly manner (i.e., graphically drag-and-drop, etc.) at the SUI for the corresponding profile user within the possibilities that the system administrator provided.

Additionally, the user can add their own field data, which might be much more specific for the user's daily work. For instance, if the user is a bank employee, they might be interested in adding an account number to the displayed information. This can be easily enhanced by, for instance, selecting an associated database table and field if the database is an internal system, or calling an API in case of external systems.

The objects that can be identified by and linked to the SUI are also customizable. For instance, the SUI can create a link for the Business Partners objects that displays the relevant information (name, address, etc.), but can be further customized such that all the objects which correspond to bank accounts will have an SUI link and display their associated relevant information (account number, account holder, amounts, etc.).

As described herein, in preferred implementations, each user will have limited visibility to the information based on their role/profile authorizations. The administrator of each system, when setting up the SUI, can decide which objects are available to be chosen and displayed for each created user profile. The administrator can also configure the access to the different systems to be accessed.

Figure 5:
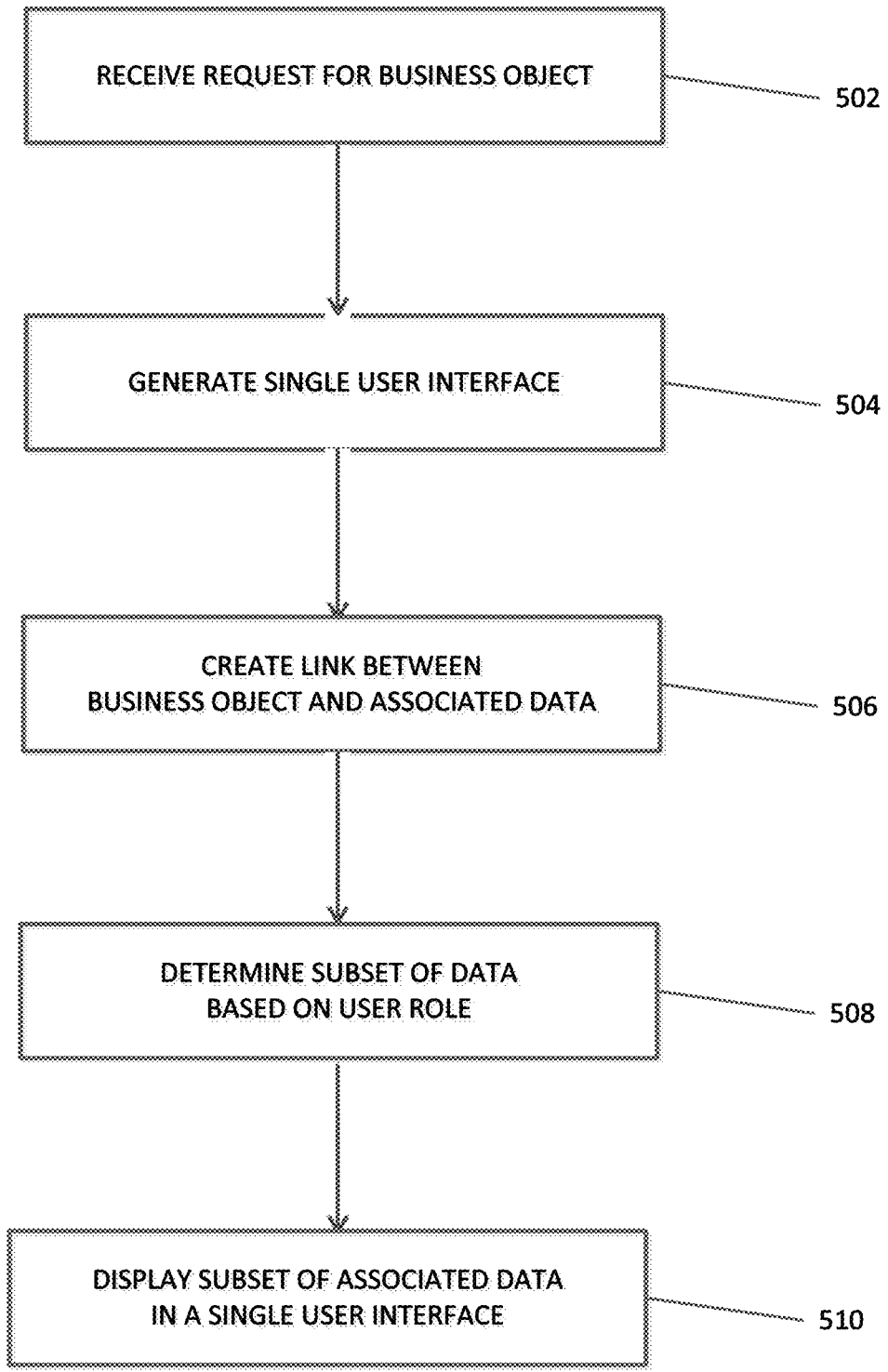
FIG. 5 is a flowchart of a method for generating a single user interface for displaying data associated with a business object that is accessible by one or more business applications.

FIG. 5 is a flowchart of a method, and a system for executing the same, for generating a single user interface for displaying data associated with a business object that is accessible by one or more business applications. At 502, a request is received from a user of one of the one or more business applications for the business object, the business object being associated with data that is stored in one or more data repositories. At 504, the single user interface is generated for displaying the data associated with the requested business object. At 506, a link is created between the requested business object and all of the data associated with the business object stored in the one or more data repositories. At 508, the system determines a subset of all of the data based on the user's role. At 510, the subset of all of the data associated with the business object is displayed in the single user interface, the displaying being based on a role associated with the user making the request for the business object, the role being used by the at least one programmable processor for determining the subset of all of the data associated with the business object for displaying in the single user interface.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT), a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method of generating a single user interface for displaying data associated with an object that is accessible by one or more applications, the method comprising:

receiving, by at least one data processor, a request from a user of one of the one or more applications for the object, the object being associated with data that is stored in one or more data repositories;

creating, by the at least one data processor, a link between the requested object and all of the data associated with the object stored in the one or more data repositories;

generating, by the at least one data processor, the single user interface for displaying the data associated with the requested object, wherein creating the link comprises:
identifying, based on a user interface of the user, one or more objects configured in the single user interface;
configuring, by the at least one data processor in response to input from an administrator, information fields of the single interface; and
mapping, based on a user profile of the user and a role assigned to the user, the data stored in the one or more data repositories to the information fields of the single user interface, the information fields comprising data from the identified one or more objects,
displaying, by the at least one data processor, a subset of all of the data associated with the object in the single user interface, the displaying being based on a role associated with the user making the request for the object, the role being used by the at least one data processor for determining the subset of all of the data associated with the object for displaying in the single user interface, the subset of all the data being available to the one or more applications used by the user, wherein displaying the subset of all data associated with the object comprises displaying, in response to a selection of an object in the single user interface, additional information fields based on the role associated with the user.

2. The method in accordance with claim 1, further comprising assigning, by the at least one data processor in response to input from a system administrator, the role to the user.

3. The method in accordance with claim 2, further comprising generating, by the at least one data processor, a set of authorizations for the user based on the role of the user, the authorizations being used by the at least one data processor for creating the link.

4. The method in accordance with claim 1, wherein the displaying further includes displaying relevant information about the customized object from any of one or more change documents, notes, transactions, logs, or workflows.

5. A computer program product for generating a single user interface for displaying data associated with a object that is accessible by one or more business applications, the computer program product comprising a machine-readable medium storing instructions that, when executed by at least one programmable processor, cause the at least one programmable processor to perform operations comprising:
assign, by the at least one data processor in response to input from a system administrator, a role to a user of one of the one or more business applications;
receive a request from a user of one of the one or more business applications for the object, the object being associated with data that is stored in one or more data repositories;
map, based on a user profile of the user and the role assigned to the user, the data stored in the one or more data repositories to information fields of the single user interface,
configure, by the at least one data processor in response to input from an administrator, the information fields;
generate the single user interface for displaying the data associated with the requested object;
create a link between the requested object and all of the data associated with the object stored in the one or more data repositories;

display a subset of all of the data associated with the object in the single user interface, the displaying being based on a role associated with the user making the request for the object, the role being used by the at least one programmable processor for determining the subset of all of the data associated with the object for displaying in the single user interface, the subset of all the data being available to the one or more business applications used by the user; and
display, in response to a selection of an object in the single user interface, additional information fields based on the role associated with the user.

6. The computer program product in accordance with claim 5, wherein the operations further comprise assign, in response to input from a system administrator, the role to the user.

7. The computer program product in accordance with claim 6, wherein the operations further comprise generate a set of authorizations for the user based on the role of the user, the authorizations being used by the at least one data processor for creating the link.

8. The computer program product in accordance with claim 5, wherein the display further includes displaying relevant information about the customized object from any of one or more change documents, notes, transactions, logs, or workflows.

9. A system for generating a single user interface for displaying data associated with a object that is accessible by one or more business applications, the system comprising:
at least one programmable processor; and
a machine-readable medium storing instructions that, when executed by the at least one processor, cause the at least one programmable processor to perform operations comprising:
receiving a request from a user of one of the one or more business applications for the object, the object being associated with data that is stored in one or more data repositories;
creating, by the at least one data processor, a link between the requested object and all of the data associated with the object stored in the one or more data repositories;
generating, by the at least one data processor, the single user interface for displaying the data associated with the requested object, wherein creating the link comprises:
identifying, based on a user interface of the user, one or more objects configured in the single user interface;
configuring, by the at least one data processor in response to input from an administrator, information fields of the single interface; and
mapping, based on a user profile of the user and a role assigned to the user, the data stored in the one or more data repositories to the information fields of the single user interface, the information fields comprising data from the identified one or more objects, and
displaying, by the at least one data processor, a subset of all of the data associated with the object in the single user interface, the displaying being based on a role associated with the user making the request for the object, the role being used by the at least one data processor for determining the subset of all of the data associated with the object for displaying in the single user interface, the subset of all the data being available to the one or more business applications used by the user, wherein displaying the subset of all data associated with the object comprises displaying, in response to a selection of an object in the single user interface, additional information fields based on a role associated with the user.

10. The system in accordance with claim 9, wherein the operations further comprise assigning, in response to input from a system administrator, the role to the user.

11. The system in accordance with claim 10, wherein the operations further comprise generating a set of authorizations for the user based on the role of the user, the authorizations being used by the at least one data processor for creating the link.

12. The system in accordance with claim 9, wherein the displaying further includes displaying relevant information about the customized object from any of one or more change documents, notes, transactions, logs, or workflows.

\* \* \* \* \*